United States Patent
Sun et al.

(10) Patent No.: US 10,708,625 B2
(45) Date of Patent: Jul. 7, 2020

(54) ADAPTIVE DEBLOCKING FILTER

(71) Applicant: Alibaba Group Holding Limited, Grand Cayman (KY)

(72) Inventors: Yu-Chen Sun, Bellevue, WA (US); Jian Lou, Bellevue, WA (US)

(73) Assignee: Alibaba Group Holding Limited, Grand Cayman (KY)

( * ) Notice: Subject to any disclaimer, the term of this patent is extended or adjusted under 35 U.S.C. 154(b) by 122 days.

(21) Appl. No.: 16/006,516

(22) Filed: Jun. 12, 2018

(65) Prior Publication Data

US 2019/0379913 A1 Dec. 12, 2019

(51) Int. Cl.
*H04N 19/86* (2014.01)
*H04N 19/66* (2014.01)
*H04N 19/176* (2014.01)
*H04N 19/182* (2014.01)

(52) U.S. Cl.
CPC ............ *H04N 19/86* (2014.11); *H04N 19/176* (2014.11); *H04N 19/182* (2014.11); *H04N 19/66* (2014.11)

(58) Field of Classification Search
None
See application file for complete search history.

(56) References Cited

U.S. PATENT DOCUMENTS

| | | | |
|---|---|---|---|
| 2009/0196342 A1* | 8/2009 | Divorra Escoda | H04N 19/50 375/240.02 |
| 2010/0208827 A1* | 8/2010 | Divorra Escoda | H04N 19/61 375/240.24 |

* cited by examiner

*Primary Examiner* — Talha M Nawaz
(74) *Attorney, Agent, or Firm* — Lee & Hayes, P.C.

(57) ABSTRACT

Systems and methods are provided for selecting and applying an appropriate deblocking filter for improved coding efficiency and compression performance by partitioning a frame into a plurality of rectangular coding units (CUs) according to the QTBT frame partitioning scheme, selecting a first and a second CUs of the plurality of rectangular CUs, where the second CU is adjacent to the first CU, identifying a CU boundary shared by the first and second CUs, determining that at least one of the first or the second CU is non-square in shape, determining a first shape of the first CU and a second shape of the second CU, adaptively selecting a deblocking filter based on the first shape and the second shape, and applying the selected deblocking filter to pixels across the CU boundary.

20 Claims, 6 Drawing Sheets

FRAME 202

ADAPTIVE DEBLOCKING FILTER

BACKGROUND

The state-of-the-art video coding standard, such as H.264/AVC (Advanced Video Coding) and H.265/HEVC (High Efficiency Video Coding) standard, is based on a hybrid coding scheme using block-based prediction and transform coding. First, the input signal is split into rectangular blocks and then predicted from previously decoded data either by inter prediction or intra prediction. The resulting prediction error is coded by applying block transforms and quantization.

In a coding scheme that uses block-based prediction and transform coding, visual artifacts can occur in reconstructed pixels at the block boundaries. Visible discontinuities at the block boundaries are known as blocking artifacts, and after block-based compression, visual artifacts can occur in the reconstructed pixels. A deblocking filter has been designed to eliminate these artifacts and improve the subjective quality, and adopted in many video coding standards, such as H.264/AVC and H.265/HEVC standards in which a frame is divided into several square coding units (CU). A difficulty associated with designing an appropriate deblocking filter is to determine whether to filter a particular block boundary, and if the deblocking filter were to be applied, then to determine on a filtering strength.

In the H.265/HEVC, one of key features of the H.265/HEVC structure is that it has the multiple partition conceptions. A frame is split into several coding tree units (CTUs), and a CTU is then split into CUs by using a quadtree structure denoted as coding tree to adapt to various local characteristics. Each CU can be further split into one, two or four prediction units (PUs) according to the PU splitting type. Inside one PU, the same prediction process is applied and the relevant information is transmitted to a decoder on a PU basis. After obtaining the residual block by applying a prediction process based on the PU splitting type, a CU can be partitioned into transform units (TUs) according to another quadtree structure similar to the coding tree for the CU.

A new block structure, quadtree plus binary tree (QTBT), has been proposed for the next generation video coding standard beyond H.265/HEVC. The QTBT structure removes the concepts of multiple partition types, i.e., it removes the separation of the CU, PU and TU concepts, and supports more flexibility for CU partition shapes. In the QTBT structure, a CU can have either a square or rectangular shape. A CTU is first partitioned by a quadtree structure, and the quadtree leaf nodes are further partitioned by a binary tree structure. In the binary tree splitting, there are two splitting types, symmetric horizontal splitting and symmetric vertical splitting. The binary tree leaf nodes are called coding units (CUs), and the binary tree segmentation is used for prediction and transforms processing without any further partitioning. This means that the CU, PU and TU have the same block size in the QTBT coding block structure.

In the H.265/HEVC, there are only square CUs and the H.265/HEVC deblocking filter is designed for square CUs. However, the QTBT introduces non-square CUs, and the deblocking filter designed for the square CUs may not provide efficient compression performance for non-square CUs.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Systems and methods discussed herein are directed to improving compression performance of a deblocking filter, and more specifically to improving compression performance by adaptively applying different deblocking filters according to shapes of coding units (CUs) resulting from frame partitioning.

Figure 1:
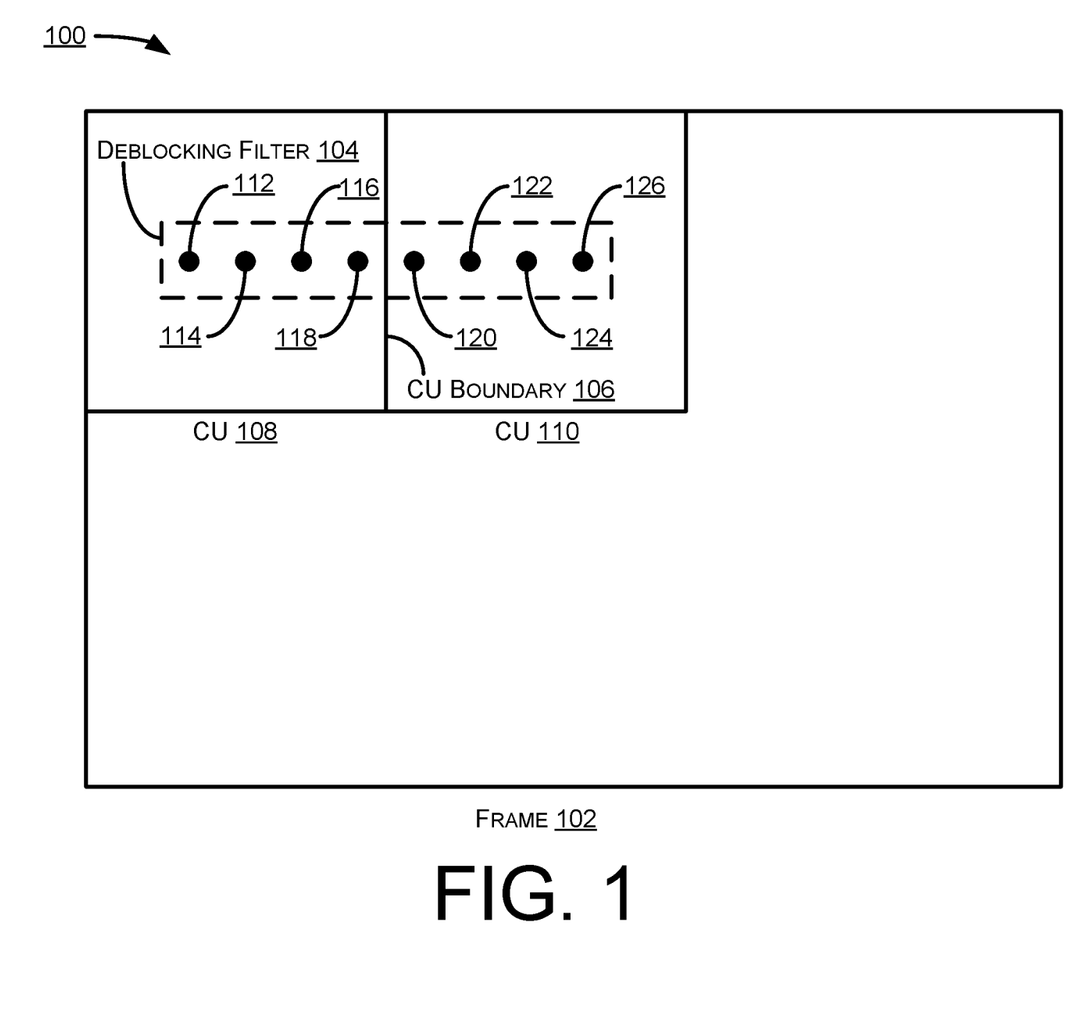
FIG. 1 illustrates an example frame partition of a frame having a deblocking filter applied to a coding unit boundary in the H.265/HEVC (High Efficiency Video Coding).

FIG. 1 illustrates an example frame partition 100 of a frame 102 having a deblocking filter 104 applied to a coding unit (CU) boundary 106 in the H.265/HEVC (High Efficiency Video Coding).

The frame 102 is shown as having two CUs, CU 108 and CU 110, that are separated by the CU boundary 106. The deblocking filter 104 is shown as applied to eight pixels, pixel 112, 114, 116, 118, 120, 122, 124, and 126, respectively, that are evenly distributed horizontally across the CU boundary 106.

In the H.265/HEVC, there are three options, or levels, of deblocking filters: strong filter, normal filter, and no filter. The strong filter is an 8-tap filter, such as the deblocking filter 104, and the normal filter, which may also be referred as a weak filter, is a 4-tap filter. For processing each pixel, a decoder adaptive module (not shown) selects a filter among the three options according to a video content. A filter selection depends on reconstructed pixel values, a coding mode, and other factors. Excessive filtering may lead to unnecessary smoothing of the picture details, whereas a lack of, or insufficient, filtering may leave blocking artifacts reducing the subjective quality.

In the Joint Exploration test Model (JEM), the reference software for next generation standard, a CU may sometimes consist of coding blocks (CBs) of different color components, for example, one CU may contain one luma CB and two chroma CBs in the case of inter slices, which are predicted by one or more neighboring frames, of the 4:2:0 chroma format. Alternatively, a CU may consist of a CB of a single component, for example, one CU may contain only one luma CB or just two chroma CBs in the case of intra slices, which are compressed without referring other frames.

The following parameters are defined for the QTBT frame partitioning scheme.

CTU size: the root node size of a quadtree, the same concept as in the H.265/HEVC.

MinQTSize: the minimum allowed quadtree leaf node size.

MaxBTSize: the maximum allowed binary tree root node size.

MaxBTDepth: the maximum allowed binary tree depth.

MinBTSize: the minimum allowed binary tree leaf node size.

In one example of the QTBT partitioning structure, the CTU size may be set as 128×128 luma samples with two corresponding 64×64 blocks of chroma samples, the MinQTSize may be set as 16×16, the MaxBTSize may be set as 64×64, the MinBTSize (for both width and height) may be set as 4×4, and the MaxBTDepth may be set as 4. The quadtree partitioning may be applied to the CTU first to generate quadtree leaf nodes, which may have a size from 16×16 (i.e., the MinQTSize) to 128×128 (i.e., the CTU size). If the leaf quadtree node were 128×128, it would not be further split by the binary tree because the size would exceed the MaxBTSize (i.e., 64×64). Otherwise, the leaf quadtree node may be further partitioned by the binary tree. Therefore, the quadtree leaf node may also be the root node for the binary tree and it had the binary tree depth as 0. When the binary tree depth reaches MaxBTDepth (i.e., 4), no further splitting may be considered. When the binary tree node has a width equal to MinBTSize (i.e., 4), no further horizontal splitting may be considered. Similarly, when the binary tree node has a height equal to MinBTSize, no further vertical splitting may be considered. The leaf nodes of the binary tree may be further processed by prediction and transform processing without any further partitioning. In the JEM, the maximum CTU size is 256×256 luma samples.

Figure 2A:
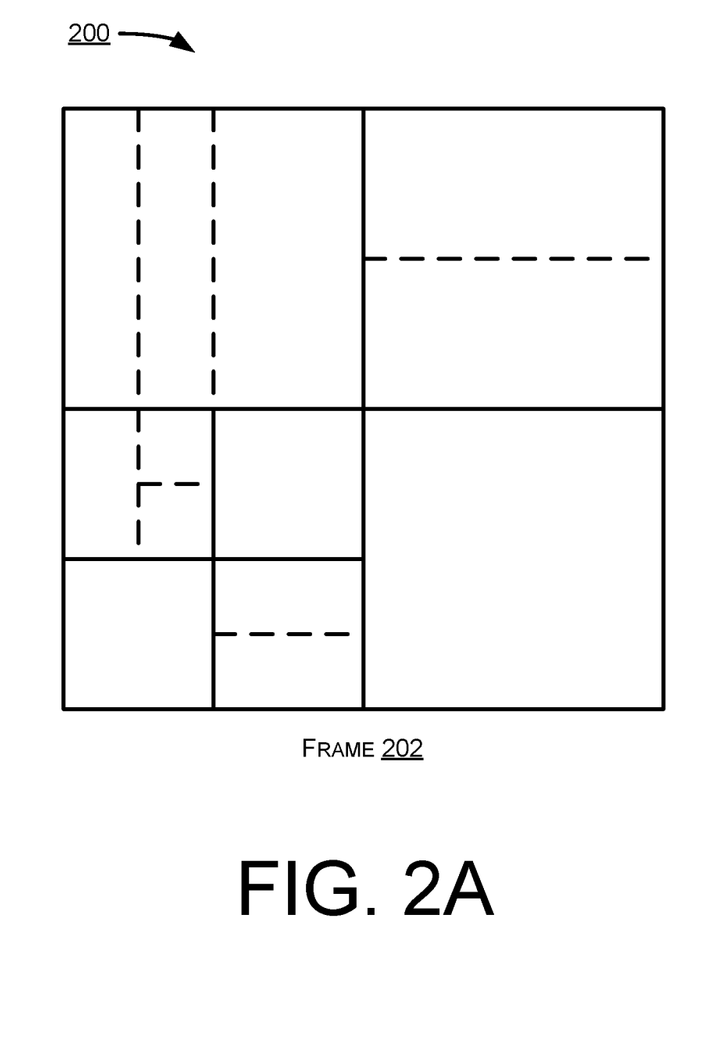
FIG. 2A illustrates an example frame partition of a frame using the quadtree plus binary tree (QTBT) and FIG. 2B illustrates the corresponding tree representation.
Figure 2B:
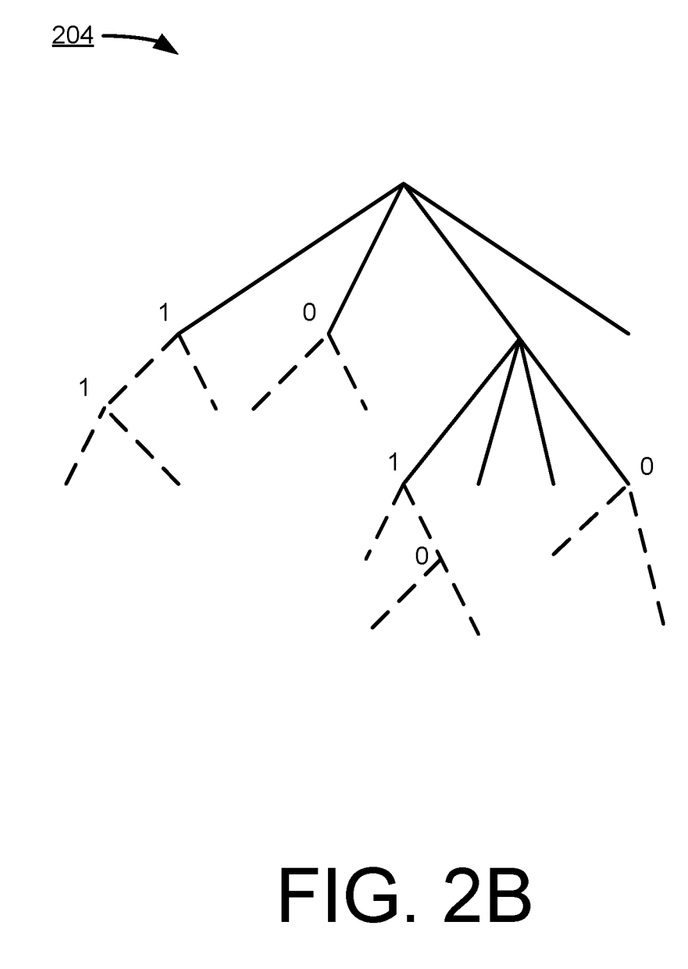

FIG. 2A illustrates an example frame partition 200 of a frame 202 using the quadtree plus binary tree (QTBT) frame partitioning scheme and FIG. 2B illustrates the corresponding tree representation 204.

In FIGS. 2A and 2B, a solid line indicates a quadtree splitting and a dotted line indicates a binary tree splitting as described above. In each splitting (i.e., non-leaf) node of the binary tree, one flag is signaled to indicate which splitting type (i.e., horizontal or vertical) is used, that is, 0 indicates a horizontal splitting and 1 indicates a vertical splitting. For a quadtree splitting, there is no need to indicate the splitting type because the quadtree splitting always splits a block both horizontally and vertically to produce 4 sub-blocks with an equal size.

Additionally, the QTBT frame partitioning scheme allows the luma and chroma to have a separate QTBT structure. For P and B slices, the luma and chroma coding tree blocks (CTBs) in one CTU share the same QTBT structure. However, for I slices, the luma CTB is partitioned into CUs by a QTBT structure, and the chroma CTBs are partitioned into chroma CUs by another QTBT structure. This means that a CU in an I slice consists of a coding block of the luma component or coding blocks of two chroma components, and a CU in a P or B slice consists of coding blocks of all three color components.

As described above, the QTBT frame partitioning scheme introduces non-square CUs in the H.265/HEVC, where only square CUs have previously been utilized, thus making the deblocking filters which are designed for the square CUs in the H.265/HEVC potentially inefficient for non-square CUs applications.

Figure 3:
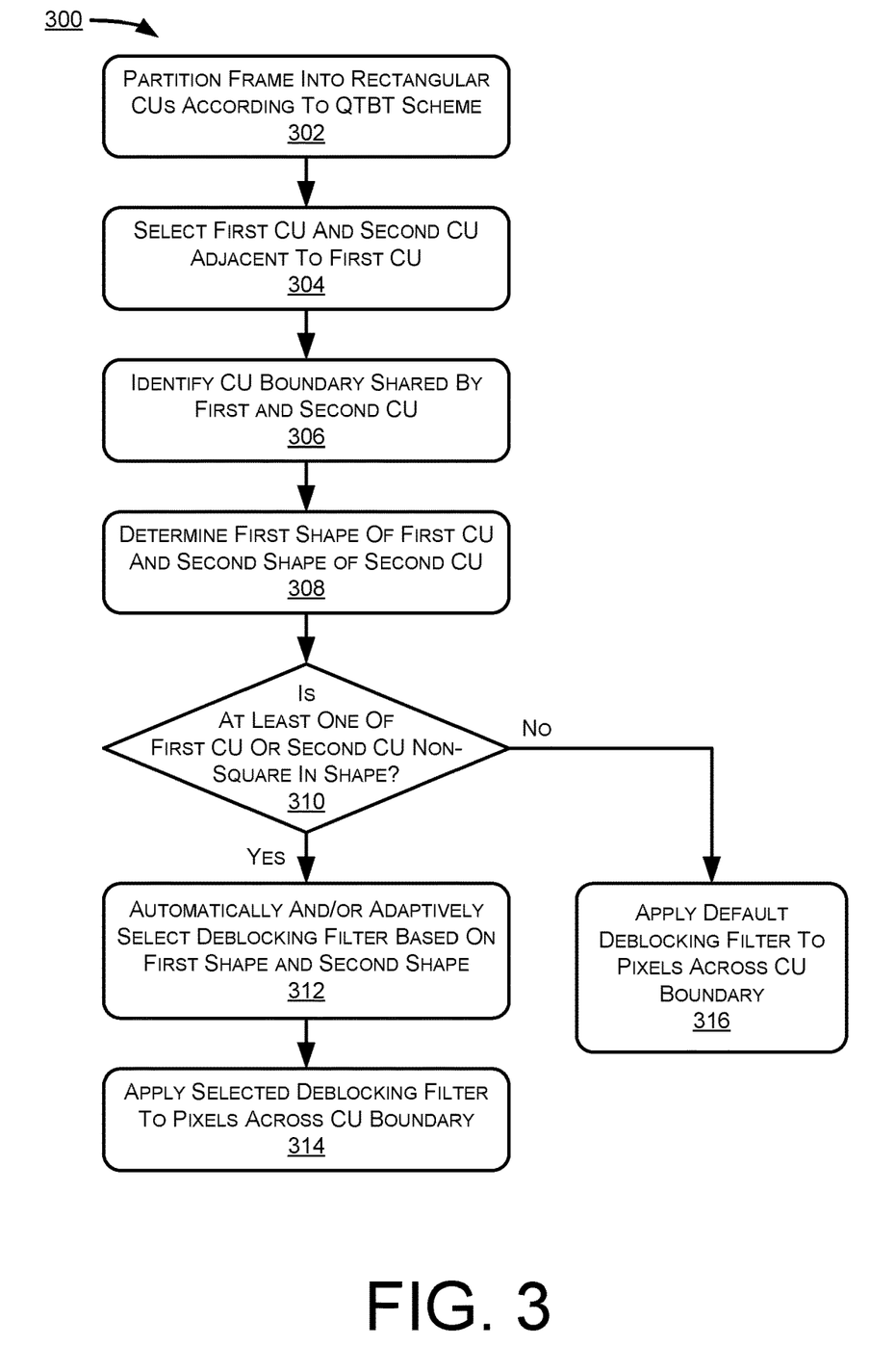
FIG. 3 illustrates an example flowchart describing a process of improving compression performance by adaptively applying an appropriate deblocking filter to square or non-square coding units resulting from the QTBT frame partitioning scheme.

FIG. 3 illustrates an example flowchart 300 describing a process of improving compression performance by adaptively applying an appropriate deblocking filter to square or non-square CUs resulting from the QTBT frame partitioning scheme.

At block 302, a frame, such as the frame 202, may be partitioned into a plurality of rectangular CUs according to the QTBT frame partitioning scheme as illustrated in FIG. 2A. From the plurality of rectangular CUs, a first CU and a second CU may be selected at block 304, where the second CU is adjacent to the first CU. The first CU may be vertically or horizontally adjacent to the second CU. At block 306, a CU boundary shared by the first and second CUs may be identified, and a first shape of the first CU and a second shape of the second CU may be determined at block 308. Whether at least one of the first CU or the second CU is non-square in shape may be determined at block 310. Upon determining that at least one of the first CU or the second CU is non-square in shape at block 310, At block 312, an appropriate deblocking filter may be automatically and/or adaptively selected based on the first shape of the first CU and the second shape of the second CU. The deblocking filter may be selected from a plurality of deblocking filters based on the first shape and second shape. The deblocking filter may then be applied to pixels across the CU boundary at block 314. By automatically and/or adaptively selecting an appropriate deblocking filter, instead of applying a default or predetermined filter regardless of the shapes of the coding units, the coding efficiency may be improved Upon determining that neither the first coding unit nor the second coding unit is non-square in shape at block 310, i.e., the first and second CUs are both square, a default deblocking filter may be applied to pixels across the CU boundary at block 316.

Figure 4:
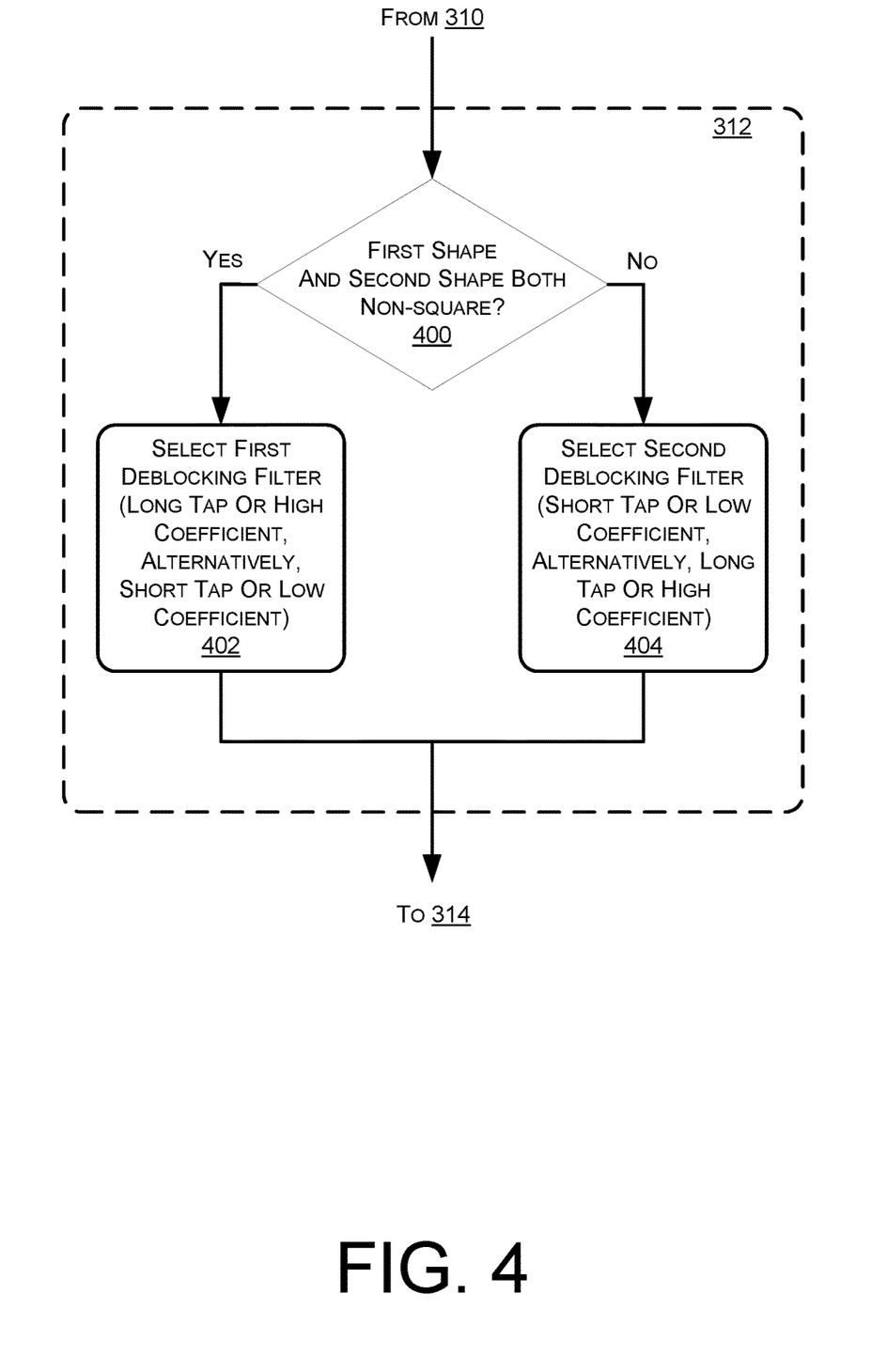
FIG. 4 illustrates an example details of one of the blocks of FIG. 3.

FIG. 4 illustrates an example details of block 310 of FIG. 3.

At block 400, whether the first shape and the second shape are both non-square in shape may be determined. Upon determining that the first shape and the second shape are both non-square in shape, a first deblocking filter may be selected as the deblocking filter at block 402. Upon determining that not both of the first shape and the second shape are non-square in shape, i.e., only one of the first shape or the second shape is non-square, a second deblocking filter may be selected as the deblocking filter at block 404. Filter options may be filters with different tap amount or different coefficient values. Filter options may be different parameters related to filter selection. For example, the decoder can adaptively change the parameters, Tc and β. The first deblocking filter may be a long tap filter or high coefficient filter, and the second deblocking filter may be a short tap filter or low coefficient filter. Alternatively, the first deblocking filter may be a short tap filter or low coefficient filter, and the second deblocking filter may be a long tap filter or high coefficient filter.

Figure 5:
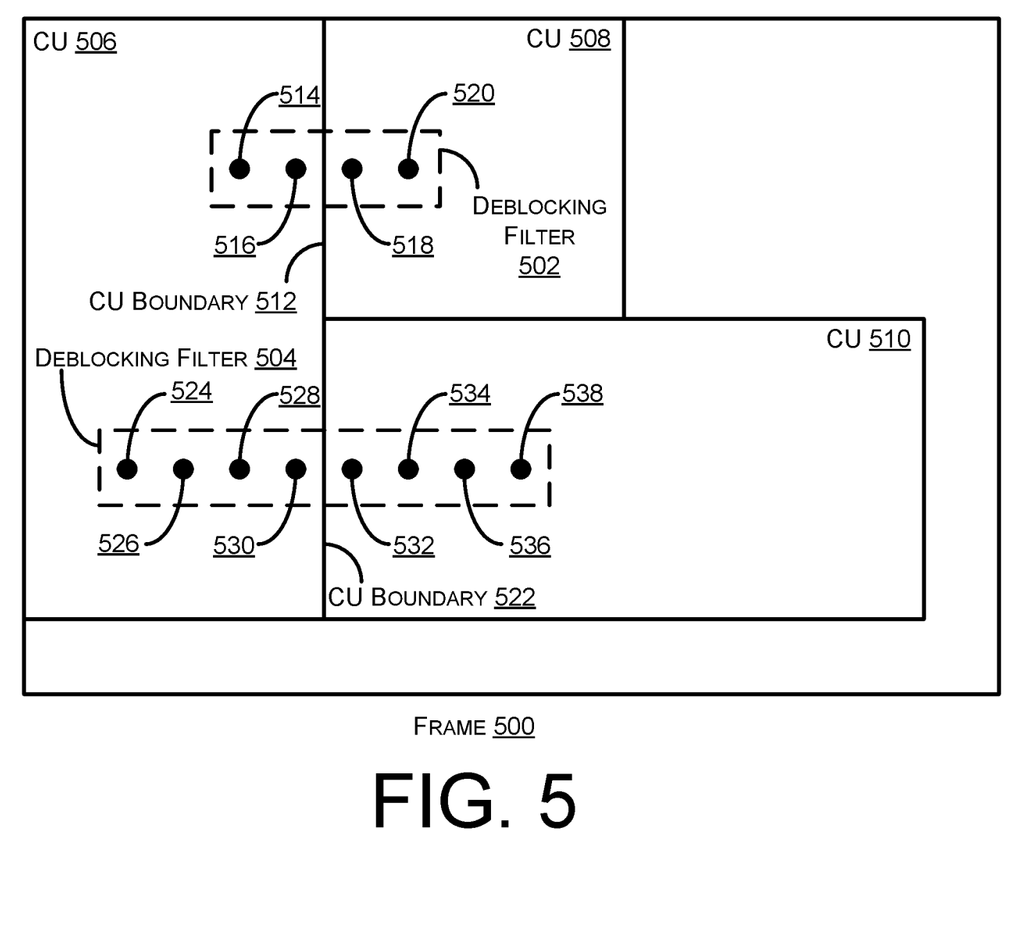
FIG. 5 illustrates an example frame in which the QTBT frame partitioning scheme is utilized, and different deblocking filters are applied to resulting CUs of different shapes.

FIG. 5 illustrates an example frame 500 in which the QTBT frame partitioning scheme is utilized, and different deblocking filters 502 and 504 are applied to resulting CUs 506, 508, and 510 of different shapes.

As described above with reference to FIGS. 3 and 4, the frame 500 may be partitioned into a plurality of CUs, such as the CUs 506, 508, and 510, according to the QTBT frame partitioning scheme. In this example, the CU 506 may be selected as the first CU and CU 508, horizontally adjacent to the CU 506, may be selected as the second CU. A shared CU boundary, such as a CU boundary 512, for the CU 506 and CU 508 may then be identified, and a first shape of the CU 506 and a second shape of the CU 508 may be determined. As shown, the CU 506 is non-square, and therefore, may have one or more deblocking filter options available to be applied over the pixels across its CU boundaries. As discussed above, filter options may be filters with different tap amount or different coefficient values. Filter options may be different parameters related to filter selection. For example, the decoder can adaptively change the parameters, Tc and β. The first deblocking filter may be a long tap filter or high coefficient filter, and the second deblocking filter may be a short tap filter or low coefficient filter. Alternatively, the first deblocking filter may be a short tap filter or low coefficient filter, and the second deblocking filter may be a long tap filter or high coefficient filter. In this example, the first deblocking filter 502 may be adaptively and/or automatically selected and applied to pixels, such as pixels 514, 516, 518, and 520, across the CU boundary 512.

In another example, the CU 506 may again be selected as the first CU and CU 510, horizontally adjacent to the CU 506, may be selected as the second CU. A shared CU boundary, such as a CU boundary 522, for the CU 506 and CU 510 may then be identified, and a first shape of the CU 506 and a second shape of the CU 510 may be determined. As shown, both the CU 506 and CU 510 are non-square, and therefore, may have one or more deblocking filter options available to be applied over the pixels across their share CU boundary 522 as described above. In this example, based on the first shape and the second shape being non-square, the second deblocking filter 504 may be adaptively and/or automatically selected and applied to pixels, such as pixels 524, 526, 528, 530, 532, 534, 536, and 538, across the CU boundary 522.

Figure 6:
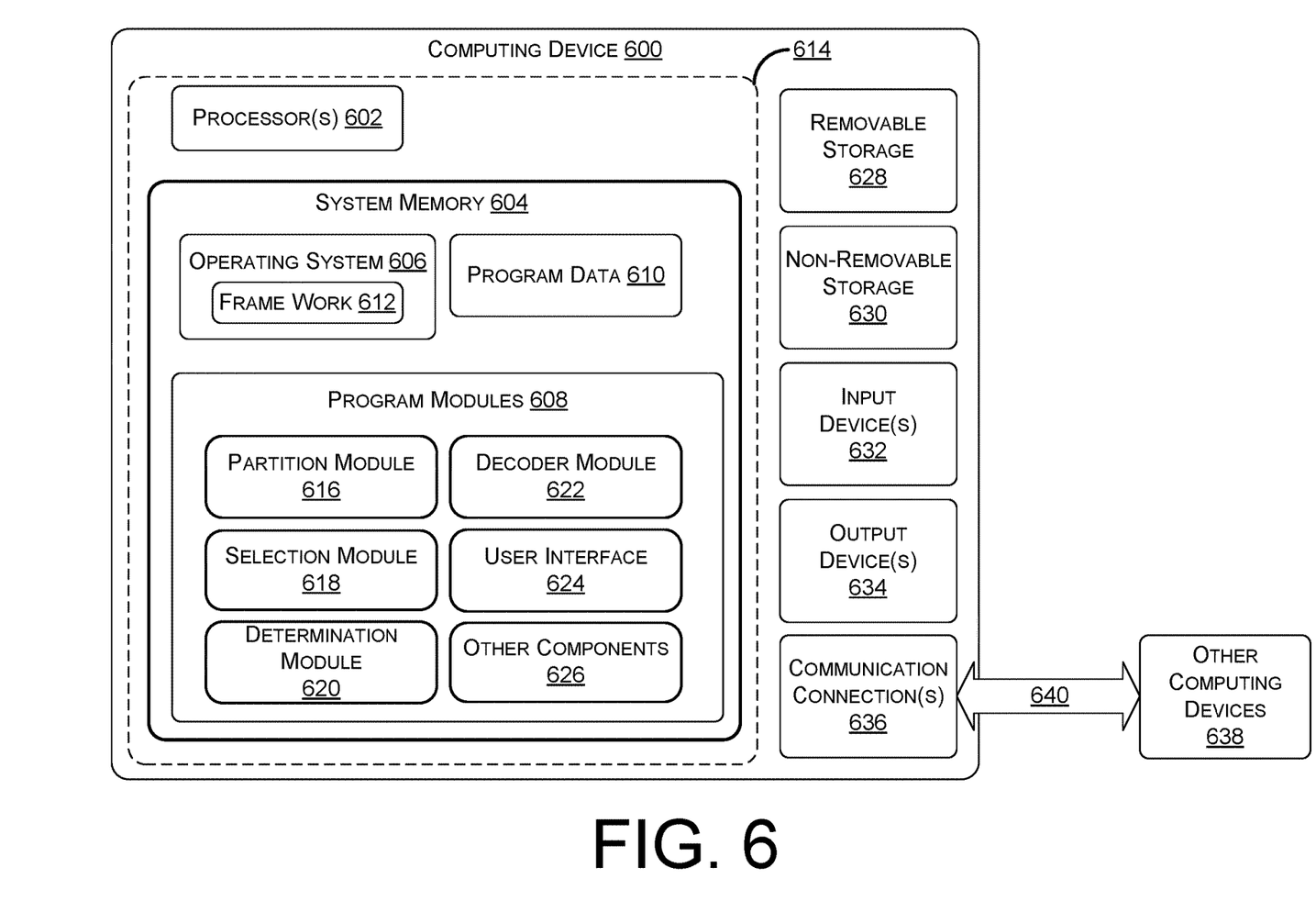
FIG. 6 illustrates an example computing device for implementing the system and methods for improving coding efficiency and compression performance by selecting and applying an appropriate deblocking filter based on coding unit shapes.

FIG. 6 illustrates an example computing device 600 for implementing the system and methods for improving coding efficiency and compression performance by selecting and applying an appropriate deblocking filter based on coding unit shapes.

The techniques and mechanisms described herein may be implemented by multiple instances of the computing device 600, as well as by any other computing device, system, and/or environment. The computing device 600 shown in FIG. 6 is only one example of a computing device and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The computing device 600 may include one or more processors 602 and system memory 604 communicatively coupled to the processor(s) 602. The processor(s) 602 may execute one or more modules and/or processes to cause the computing device 600 to perform a variety of functions. In some embodiments, the processor(s) 602 may include a central processing unit (CPU), a graphics processing unit (GPU), both CPU and GPU, or other processing units or components known in the art. Additionally, each of the processor(s) 602 may possess its own local memory, which also may store program modules, program data, and/or one or more operating systems.

Depending on the exact configuration and type of the computing device 600, the system memory 604 may be volatile, such as RAM, non-volatile, such as ROM, flash memory, miniature hard drive, memory card, and the like, or some combination thereof. The system memory 604 may include an operating system 606, one or more program modules 608, and may include program data 610. The operating system 606 may include a component based framework 612 that may support components including properties and events, objects, inheritance, polymorphism, reflection, and may provide an object-oriented component-based application programming interface (API). The computing device 600 may be of a very basic illustrative configuration demarcated by a dashed line 614.

The program modules 608 may include, but are not limited to, a partition module 616, a selection module 618, a determination module 620, a decoder module 622, a user interface 624, and/or other components 626. The partition module 616 may be configured to partition a frame, such as the frames 202 and 500, into a plurality of rectangular coding units. The selection module 618 may be configured to select a first CU, such as the CU 506, and a second CU, such as the CU 508, of the plurality of rectangular coding units as described above with reference to FIG. 3, where the second CU is adjacent to the first CU. The determination module 620 may be configured to identify a CU boundary, such as the CU boundaries 512 and 522, shared by the first and second CUs, determine a first shape of the first CU, such as the CU 506, and a second shape of the second CU, such as the CU 508, and determine whether at least one of the first CU or the second CU is non-square in shape. The decoder module 622 may be configured to adaptively select a deblocking filter based on the first shape and the second shape, upon the determination module 620 determining that at least one of the first CU or the second CU is non-square in shape, and may apply the selected de blocking filter to pixels, such as pixels 514, 516, 518, and 520, across the CU boundary, such as the CU boundary 512. The decoder module 622 may be further configured to select a first deblocking filter as the deblocking filter upon determining that both the first shape and the second shape are non-square in shape, or select a second deblocking filter as the deblocking filter upon the determination module 620 determining that only one of the first shape or the second shape is non-square in shape.

The computing device 600 may have additional features and/or functionality. For example, the computing device 600 may also include additional data storage devices (removable and/or non-removable) such as, for example, magnetic disks, optical disks, or tape. Such additional storage is illustrated in FIG. 6 as removable storage 628 and non-removable storage 630.

The computing device 600 may also have input device(s) 632 such as a keyboard, a mouse, a pen, a voice input device, a touch input device, and the like. Output device(s) 634, such as a display, speakers, a printer, and the like, may also be included.

The computing device 600 may also contain communication connections 636 that allow the computing device 600 to communicate with other computing devices 638, over a network 640. The network 640, communication media, and/or communication connections may include the Internet, wired media such as a wired network or direct-wired connections, and wireless media such as acoustic, radio frequency (RF), infrared, and other wireless media. The communication connections 636 are some examples of communication media. Communication media may typically be embodied by computer readable instructions, data structures, program modules, and the like.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random access memory (RAM)) and/or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 2-6. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
    partitioning a frame into a plurality of rectangular coding units;
    selecting a first coding unit and a second coding unit of the plurality of rectangular coding units, the second coding unit being adjacent to the first coding unit;
    identifying a coding unit boundary shared by the first coding unit and second coding unit;
    determining a first shape of the first coding unit and a second shape of the second coding unit;
    upon determining that at least one of the first coding unit or the second coding unit is non-square in shape,
        adaptively selecting a deblocking filter based on the first shape and the second shape by:
            determining whether the first shape and the second shape are both non-square in shape or only one of the first shape or the second shape is non-square in shape,
            upon determining that the first shape and the second shape are both non-square in shape, selecting a first deblocking filter as the deblocking filter, or
            upon determining that only one of the first shape or the second shape is non-square in shape, selecting a second deblocking filter as the deblocking filter; and
        applying the selected deblocking filter to pixels across the coding unit boundary.

2. The method of claim 1, wherein the second coding unit is vertically adjacent to the first coding unit.

3. The method of claim 1, wherein the second coding unit is horizontally adjacent to the first coding unit.

4. The method of claim 1, wherein adaptively selecting the deblocking filter based on the first shape and the second shape includes selecting the deblocking filter from a plurality of deblocking filters based on the first shape and second shape.

5. The method of claim 1, wherein the first deblocking filter is a strong filter and the second deblocking filter is a weak filter.

6. The method of claim 5, wherein the strong filter is a long tap filter and the weak filter is a short tap filter.

7. The method of claim 1, wherein the first deblocking filter is a weak filter and the second deblocking filter is a strong filter.

8. The method of claim 7, wherein the strong filter is a long tap filter and the weak filter is a short tap filter.

9. A non-transitory computer-readable storage medium storing computer-readable instructions executable by one or more processors, that when executed by the one or more processors, cause the one or more processors to perform operations comprising:
    partitioning a frame into a plurality of rectangular coding units;
    selecting a first coding unit and a second coding unit of the plurality of rectangular coding units, the second coding unit being adjacent to the first coding unit;
    identifying a coding unit boundary shared by the first coding unit and second coding unit;
    determining whether at least one of the first coding unit or the second coding unit is non-square in shape;

upon determining that at least one of the first coding unit or the second coding unit is non-square in shape,
    determining a first shape of the first coding unit and a second shape of the second coding unit;
    adaptively selecting a deblocking filter based on the first shape and the second shape by:
        determining whether the first shape and the second shape are both non-square in shape or only one of the first shape or the second shape is non-square in shape,
            upon determining that the first shape and the second shape are both non-square in shape, selecting a first deblocking filter as the deblocking filter, or
            upon determining that only one of the first shape or the second shape is non-square, selecting a second deblocking filter as the deblocking filter; and
    applying the selected deblocking filter to pixels across the coding unit boundary.

10. The non-transitory computer-readable storage medium of claim 9, wherein the second coding unit is vertically adjacent to the first coding unit.

11. The non-transitory computer-readable storage medium of claim 9, wherein the second coding unit is horizontally adjacent to the first coding unit.

12. The non-transitory computer-readable storage medium of claim 9, wherein adaptively selecting the deblocking filter based on the first shape and the second shape includes selecting the deblocking filter from a plurality of deblocking filters based on the first shape and second shape.

13. The non-transitory computer-readable storage medium of claim 9, wherein the first deblocking filter is a strong filter and the second deblocking filter is a weak filter.

14. The non-transitory computer-readable storage medium of claim 13, wherein the strong filter is a long tap filter and the weak filter is a short tap filter.

15. The non-transitory computer-readable storage medium of claim 9, wherein the first deblocking filter is a weak filter as the deblocking filter and the second deblocking filter is a strong filter.

16. The non-transitory computer-readable storage medium of claim 15, wherein the strong filter is a long tap filter and the weak filter is a short tap filter.

17. A computing device comprising:
one or more processors; and
memory communicatively coupled to the one or more processors, the memory storing computer-executable modules executable by the one or more processors, that when executed by the one or more processors, perform associated operations, the computer-executable modules including:
    a partition module configured to partition a frame into a plurality of rectangular coding units;
    a selection module configured to select a first coding unit and a second coding unit of the plurality of rectangular coding units, the second coding unit being adjacent to the first coding unit;
    a determination module configured to:
        determine whether at least one of the first coding unit or the second coding unit is non-square in shape,
        upon determining that at least one of the first coding unit or the second coding unit is non-square in shape, identify a coding unit boundary shared by the first and second coding units,
        determine a first shape of the first coding unit and a second shape of the second coding unit, and
        determine whether the first shape and the second shape are both non-square in shape or only one on of the first shape or the second shape is non-square in shape; and
    a decoder module configured to:
        adaptively select a deblocking filter based on the first shape and the second shape by
            selecting a first deblocking filter as the deblocking filter upon the determination module determining that the first shape and the second shape are both non-square in shape, or
            selecting a second deblocking filter as the deblocking filter upon the determination module determining that only one of the first shape or the second shape is non-square, and
        apply the selected deblocking filter to pixels across the coding unit boundary.

18. The computing device of claim 17, wherein the second coding unit is one of:
vertically adjacent to the first coding unit, or
horizontally adjacent to the first coding unit.

19. The computing device of claim 17, wherein the decoder module is further configured to adaptively select the deblocking filter based on the first shape and the second shape by selecting the deblocking filter from a plurality of deblocking filters based on the first shape and second shape.

20. The computing device of claim 17, wherein:
the first deblocking filter is a strong filter and the second deblocking filter is a weak filter, or
the first deblocking filter is a weak filter and the second deblocking filter is a strong filter.

* * * * *